(12) United States Patent
Noyama et al.

(10) Patent No.: US 7,779,821 B2
(45) Date of Patent: Aug. 24, 2010

(54) INTAKE-AIR COOLING DEVICE FOR INTERNAL COMBUSTION ENGINE AND AUTOMOBILE USING THE SAME

(75) Inventors: Hideto Noyama, Aichi (JP); Tsuyoshi Hayashi, Tokyo (JP); Atsushi Kodama, Tokyo (JP)

(73) Assignees: Mitsubishi Heavy Industries, Ltd., Tokyo (JP); Mitsubishi Jidosha Kogyo Kabushiki Kaisha, Tokyo (JP)

( * ) Notice: Subject to any disclaimer, the term of this patent is extended or adjusted under 35 U.S.C. 154(b) by 13 days.

(21) Appl. No.: 12/364,876

(22) Filed: Feb. 3, 2009

(65) Prior Publication Data

US 2009/0228192 A1 Sep. 10, 2009

(30) Foreign Application Priority Data

Mar. 5, 2008 (JP) ............................. 2008-054514

(51) Int. Cl.
*F02M 15/00* (2006.01)
*F02B 33/00* (2006.01)

(52) U.S. Cl. ..................................... 123/542; 123/563

(58) Field of Classification Search ... 123/41.19–41.23, 123/540, 542, 563, 494, 406.21, 406.24, 123/406.26, 406.29, 559.1; 60/565, 612; 701/111, 559.1

See application file for complete search history.

(56) References Cited

U.S. PATENT DOCUMENTS

| | | | | |
|---|---|---|---|---|
| 4,480,439 A * | 11/1984 | Yamane | | 60/599 |
| 4,683,725 A * | 8/1987 | Sugiura | | 62/199 |
| 6,347,618 B1 * | 2/2002 | Klem | | 123/561 |
| 6,748,934 B2 * | 6/2004 | Natkin et al. | | 123/563 |
| 6,779,515 B2 * | 8/2004 | Vaught et al. | | 123/563 |
| 6,796,134 B1 * | 9/2004 | Bucknell et al. | | 62/133 |
| 2002/0116927 A1 * | 8/2002 | Klem | | 60/612 |
| 2005/0279093 A1 * | 12/2005 | Wang et al. | | 60/599 |
| 2007/0000247 A1 * | 1/2007 | Perkins | | 60/565 |

FOREIGN PATENT DOCUMENTS

JP 62-153518 A 7/1987

* cited by examiner

*Primary Examiner*—Thomas N Moulis
(74) *Attorney, Agent, or Firm*—Westerman, Hattori, Daniels & Adrian, LLP

(57) ABSTRACT

The invention provides an intake-air cooling device for an internal combustion engine that can be installed compactly. The invention provides an intake-air cooling device for a gasoline engine equipped with an intercooler that cool intake air with outside air and an evaporator that cools intake air with refrigerant circulating in a bypass refrigeration circuit, disposed in this sequence in an intake-air channel from a supercharger to the gasoline engine. The intercooler is disposed in an outside-air duct through which outside air passes, the evaporator is disposed inside a case through which the intake air passes, and a bottom plate of the case forms part of the outside-air duct.

7 Claims, 3 Drawing Sheets

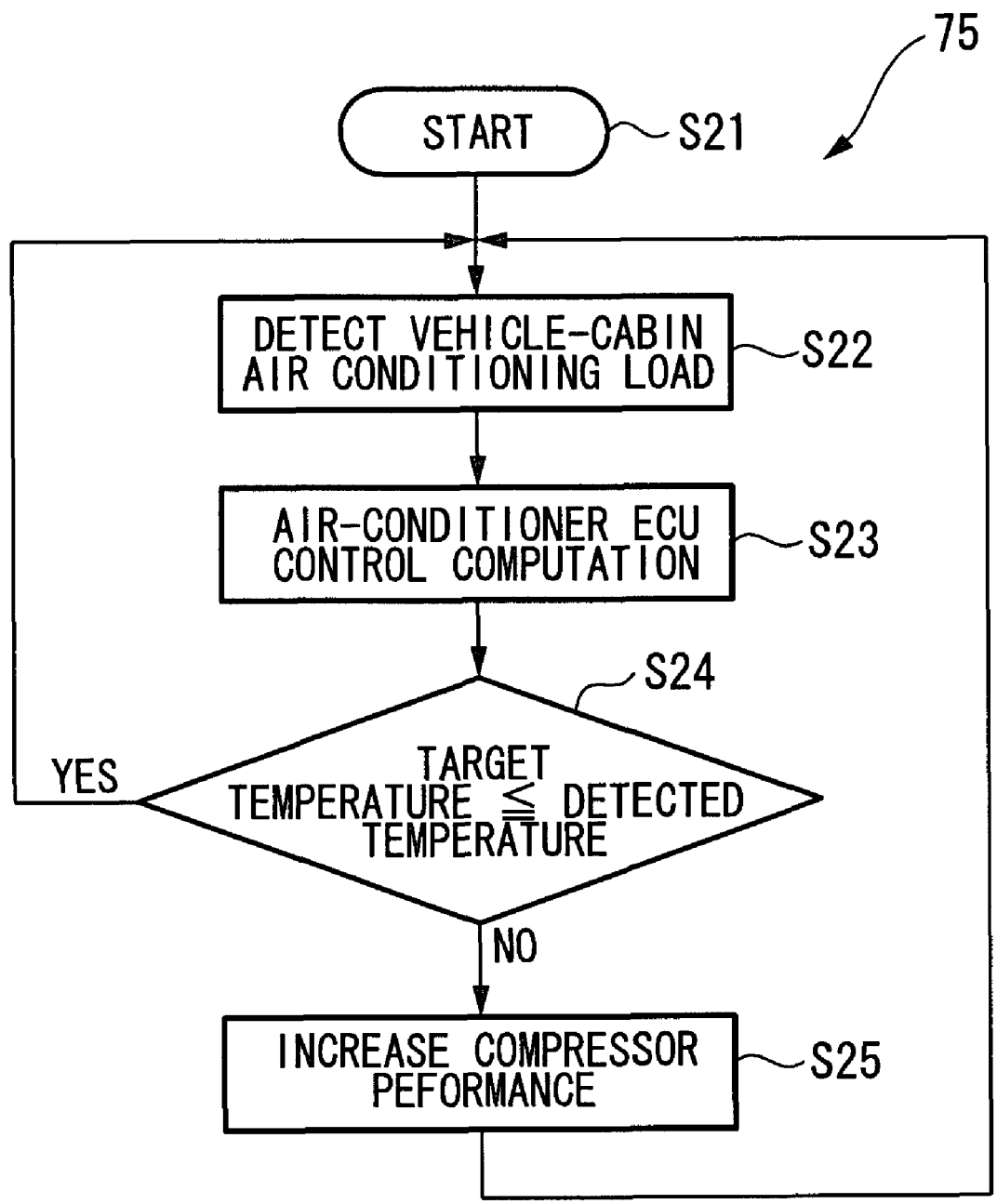

INTAKE-AIR COOLING DEVICE FOR INTERNAL COMBUSTION ENGINE AND AUTOMOBILE USING THE SAME

BACKGROUND OF THE INVENTION

1. Field of the Invention

The present invention relates to an intake-air cooling device for an internal combustion engine and to an automobile using the same.

2. Description of Related Art

One widely used way of raising the output power of internal combustion engines, such as gasoline engines, is to increase the amount of intake air using a supercharger.

When the intake air is compressed with a supercharger, the temperature of the intake air rises and the inlet temperature to the gasoline engine thus increases, which reduces the charging efficiency and increases the temperature of the air-fuel mixture, which tends to cause knocking.

Methods of suppressing knocking include delaying the ignition timing and enriching the air-fuel ratio of the air-fuel mixture; however, these methods deteriorate the output and the fuel consumption.

Therefore, the intake air sent from the supercharger is usually cooled by using an intercooler in which outside air functions as the cooling source.

One device that has been proposed to effectively perform such cooling is disclosed, for example, in Japanese Unexamined Patent Application, Publication No. SHO-62-153518. It is equipped with a first heat exchanger that cools the intake air from the supercharger by using outside air and a second heat exchanger, downstream of the first heat exchanger, that cools the intake air with refrigerant that circulates in a refrigeration circuit of a vehicle-cabin cooling device.

The intake air temperature is measured at an outlet of the first heat exchanger, and if this intake air temperature exceeds a predetermined value, it is assumed that there is a risk of knocking, and the second heat exchanger is thus operated to cool the intake air. Therefore, knocking can be prevented in the internal combustion engine without delaying the ignition timing of the spark plugs and without enriching the air-fuel ratio. Therefore, it is possible to increase the output of the internal combustion and to improve the fuel consumption.

However, when refrigerant is supplied to the second heat exchanger, the refrigerant used to cool the vehicle cabin is reduced by a corresponding amount. Therefore, if, for example, a prescribed cooling performance is required, it is necessary to increase the performance of a compressor. Because the compressor is driven by the internal combustion engine, the output of the internal combustion engine increases by an amount corresponding to the increase in performance of the compressor. In other words, because the output of the internal combustion engine increases, the fuel consumption increases, and the operating efficiency of the internal combustion engine decreases accordingly.

With the invention disclosed in Japanese Unexamined Patent Application, Publication No. SHO-62-153518, it is determined that there is a risk of knocking when the intake air temperature at the outlet of the first heat exchanger exceeds the predetermined value, in other words, indirect determination. Therefore, this determination occurs at a timing having a certain margin relative to the timing at which knocking actually occurs.

As a result, the intake air is cooled with refrigerant even when it is not necessary to do so, and therefore, the operating efficiency of the internal combustion engine is decreased by a corresponding amount.

BRIEF SUMMARY OF THE INVENTION

In light of the problem described above, the present invention provides an intake-air cooling device for an internal combustion engine which can cool intake air with refrigerant at required times and operate at high efficiency, as well as an automobile using the same.

In order to solve the problem described above, the present invention employs the following solutions.

A first aspect of the present invention is an intake-air cooling device for an internal combustion engine equipped with an intercooler that cools intake air with outside air and an intake-air evaporator that cools the intake air with refrigerant circulating in an air-conditioning refrigeration circuit, provided in this sequence in an intake-air channel from a supercharger to the internal combustion engine, the intake-air cooling device including a knocking sensor that detects knocking of the internal combustion engine; and an opening-and-closing valve that opens and closes a supply channel of the refrigerant to the intake-air evaporator, wherein the opening-and-closing valve is configured so as to open when the knocking sensor detects knocking.

According to this aspect, when the knocking sensor detects knocking of the internal combustion engine, the opening-and-closing valve provided in the supply channel of refrigerant to the intake-air evaporator is opened, and the refrigerant flows into the intake-air evaporator via this supply channel and cools the intake air passing through the intake-air channel.

When the intake air is cooled, the temperature of the intake air flowing into the internal combustion engine falls, and therefore, it is possible to improve the charging efficiency and to prevent knocking from occurring.

Accordingly, because it is possible to prevent knocking of the internal combustion engine without, for example, delaying the ignition timing of the spark plugs and without enriching the air-fuel ratio, the output of the internal combustion engine can be improved and the fuel consumption can be reduced; in other words, the internal combustion engine can operate with high efficiency.

Because the opening-and-closing valve is opened when knocking is detected, cooling of the intake air is performed just as cooling is required. Thus, the intake-air evaporator is not supplied with refrigerant when it is not necessary to do so, and therefore, additional output, for example, for maintaining the air-conditioning performance, is not required during periods where it is not necessary. As a result, the operating efficiency of the internal combustion engine is not needlessly reduced, and therefore, the internal combustion engine can operate with high efficiency.

The term "knocking" used here includes actual knocking and a state predictive thereof.

In the aspect described above, the knocking sensor may detect vibration of the internal combustion engine.

In the aspect described above, the knocking sensor may detect a cylinder pressure of the internal combustion engine.

In the aspect described above, when the opening-and-closing valve is opened, the refrigeration circuit may adjust the performance of a compressor that compresses and supplies the refrigerant so as to maintain air-conditioning performance at a prescribed level.

When the opening-and-closing valve is opened and the refrigerant is supplied to the intake-air evaporator, the refrigerant used for air conditioning is reduced by a corresponding amount. In such a case, with this configuration, because the performance of the compressor that compresses and supplies refrigerant is adjusted so as to maintain the air-conditioning performance at a prescribed level, it is possible to prevent a drop in air-conditioning performance.

Adjusting the performance of the compressor means, for example, increasing the refrigerant discharge capacity with a variable-capacity compressor, or increasing the engagement time of a make-and-break clutch that engages or disengages power transmission to the compressor. Accordingly, because the amount of refrigerant discharged from the compressor can be increased, it is possible to maintain the amount of refrigerant used for air conditioning, even though some refrigerant is supplied to the intake-air evaporator.

In the aspect described above, the intake-air evaporator may be configured so as to constantly receive a prescribed amount of refrigerant during operation.

Because the intake-air evaporator is configured to constantly receive a prescribed amount of refrigerant during operation in this way, the intake-air evaporator is always cooled during operation; in other words, it is pre-cooled. By doing so, because the intake-air evaporator is kept at a low temperature, when the opening-and-closing valve is opened and refrigerant is supplied to the intake-air evaporator, this refrigerant can immediately cool the intake air without being used to cool the intake-air evaporator itself.

Therefore, when knocking is detected and the opening-and-closing valve is opened, it is possible to cool the intake air without delay.

In this case, the prescribed amount means an amount that avoids energy loss as much as possible, and is preferably a small amount that allows the intake-air evaporator to be maintained at a prescribed temperature.

In the aspect described above, when the output of the internal combustion engine is large, all of the refrigerant flowing in the refrigeration circuit may be made to flow to the intake-air evaporator.

When the output of the internal combustion engine increases, because the amount of intake air increases in accordance therewith, a large cooling capacity is required to cool it.

In such a case, with this configuration, all of the refrigerant flowing in the refrigeration circuit flows to the intake-air evaporator; in other words, no refrigerant is supplied, for example, to the vehicle-cabin air conditioner for air-conditioning. Therefore, the intake air can be sufficiently cooled.

A second aspect of the present invention is an automobile including the intake-air cooling device for an internal combustion engine described above.

By using the intake-air cooling device that allows the internal combustion engine to operate with high efficiency in this way, it is possible to increase the output and improve the fuel consumption of the internal combustion engine; in other words, it is possible to operate at high efficiency.

According to the present invention, because the knocking sensor that detects knocking of the internal combustion engine and the opening-and-closing valve that opens and closes the refrigerant supply channel to the intake-air evaporator are provided, and because the opening-and-closing valve is configured to be opened when the knocking sensor detects knocking, it is possible to prevent knocking of the internal combustion engine without, for example, delaying the ignition timing of the spark plugs and without enriching the air-fuel ratio. Therefore, it is possible to increase the output of the internal combustion engine and improve the fuel consumption; in other words, it is possible to operate at high efficiency.

Furthermore, because the opening-and-closing valve is opened when knocking is detected, the operating efficiency of the internal combustion engine is not needlessly reduced, and the internal combustion engine can thus operate at high efficiency.

BRIEF DESCRIPTION OF THE SEVERAL VIEWS OF THE DRAWINGS

FIG. 3 is a flow chart showing the flow of operation of an air-conditioning maintaining mode according to an embodiment of the present invention.

DETAILED DESCRIPTION OF THE INVENTION

An intake-air cooling device 3 used in an automobile gasoline engine (internal combustion engine) 1 according to an embodiment of the present invention will be described below with reference to FIGS. 1 to 3.

Figure 1:
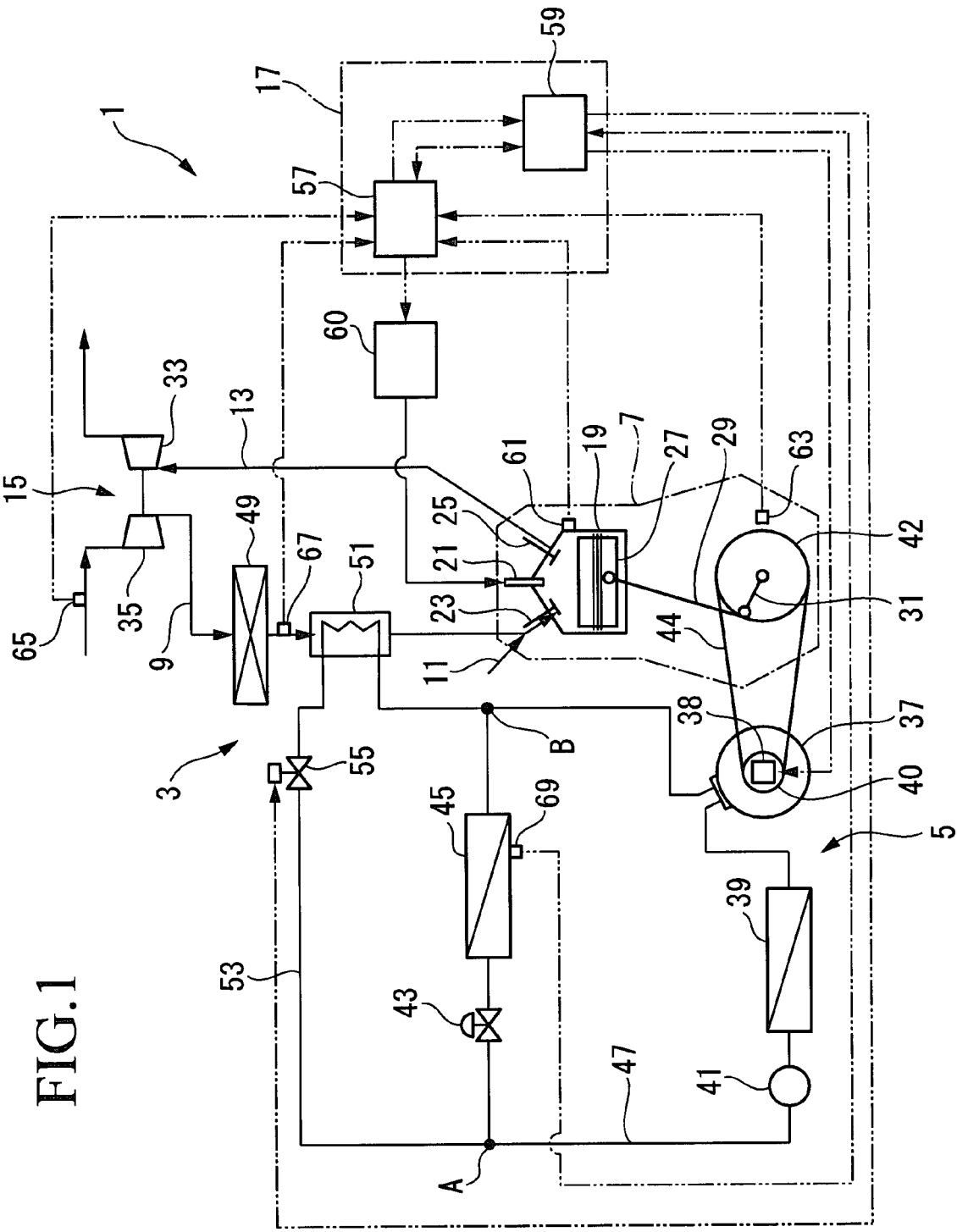
FIG. 1 is a block diagram showing, in outline, the configuration of a vehicle air-conditioning apparatus and a gasoline engine equipped with an intake-air cooling device according to an embodiment of the present invention.

FIG. 1 is a block diagram showing, in outline, the configuration of a vehicle air-conditioning apparatus 5 and the gasoline engine 1 equipped with the intake-air cooling device 3 according to this embodiment.

The gasoline engine 1 is provided with an engine body 7, an intake-air pipe (intake-air channel) 9, a fuel supply pipe 11, an exhaust pipe 13, a supercharger 15, and a control unit 17. The fuel supply pipe 11 merges with the intake air pipe 9 at the engine body 7 side thereof.

A plurality of cylinders 19 are provided in the engine body 7. A spark plug 21, an intake-air valve 23 that opens and closes the intake air pipe 9 connected thereto, and an exhaust valve 25 that opens and closes the exhaust pipe 13 connected thereto are mounted to a cylinder head of each of the cylinders 19.

A piston 27 is held inside each of the cylinders 19 in such a manner as to be capable of sliding in the longitudinal direction thereof. One end of a connecting rod 29 is attached in a rotatable manner to the bottom of the piston 27, and the other end is attached in a rotatable manner to the tip of a crank rod 31 which is attached to a crank (not shown in the drawing). The crank rod 31 and the connecting rod 29 form a link mechanism that functions to convert the linear reciprocating motion of the piston 27 into rotary motion.

The supercharger 15 is provided with a turbine 33 which is rotationally driven by the exhaust from the cylinders 19 and a blower 35 which is rotationally driven in accordance with the rotation of the turbine 33 to compress air.

The air compressed by the blower 35 (intake air) is supplied to the cylinders 19 via the intake air pipe 9.

The vehicle air-conditioning apparatus 5 is provided with a compressor 37 that compresses refrigerant to a high-temperature and high-pressure gas state, a condenser 39 that cools the gaseous refrigerant from the compressor 37 with outside air to condense it, a receiver 41 that supplies the condensed refrigerant, an air-conditioning expansion valve 43 that decompresses the refrigerant, and an evaporator 45 that performs heat exchange between the air in the vehicle cabin and the refrigerant.

An air-conditioning refrigeration circuit 47 is formed so as to circulate refrigerant via the compressor 37, the condenser 39, the receiver 41, the air-conditioning expansion valve 43, and the evaporator 45.

A pulley 40 is attached to the compressor 37, in a manner allowing it to be engaged with and disengaged from one end of a rotating shaft via an electromagnetic clutch 38.

The pulley 40 is connected via a belt 44 to a clutch pulley 42 securely attached to a clutch and is rotationally driven by the rotation of the clutch.

The compressor 37 is either driven or not driven by the gasoline engine 1 depending on whether the electromagnetic clutch 38 is engaged or disengaged, respectively.

The intake-air cooling device 3 in provided at an intermediate point in the intake-air pipe 9.

The intake-air cooling device 3 is provided with an intercooler 49 which performs heat exchange between the intake air and the outside air, and an intake-air evaporator 51 which performs heat exchange between the intake air and the refrigerant circulating in the air-conditioning refrigeration circuit 47.

The air-conditioning refrigeration circuit 47 includes a bypass refrigeration circuit (refrigeration circuit) 53 that connects a point A downstream of the receiver 41 and a point B downstream of the evaporator 45. The bypass refrigeration circuit 53 is configured so as to pass through the intake-air evaporator 51. On the upstream side of the intake-air evaporator 51, the bypass refrigeration circuit 53 is provided with a bypass expansion valve 55 that decompresses the refrigerant The bypass expansion valve 55 functions as an electromagnetic opening-and-closing valve.

The control unit 17 performs overall control of the automobile. The control unit 17 is provided with an engine ECU 57 serving as a control section that controls the operation of the gasoline engine 1, for example, the fuel injection, ignition timing, knocking, idling speed, etc., and an air-conditioner ECU 59 serving as a control section that controls the operation of the vehicle air-conditioning apparatus 5.

The engine ECU 57 and the air-conditioner ECU 59 are formed of an input/output device, a storage device (ROM, RAM, etc.) that stores a control program, control map, etc., a central processing unit (CPU), a timer counter, and so forth (not shown in the drawing).

A knocking-suppression control program for preventing the occurrence of knocking is stored in the storage device of the engine ECU 57.

The knocking-suppression control program includes, as main modes, an intake-air cooling mode 71 that prevents knocking by cooling the intake air with the intake-air evaporator 51, and an engine-operation mode 73 that prevents knocking by controlling the operation of the gasoline engine 1, for example, the ignition timing, the air-fuel ratio, etc.

It also includes various sub-modes that are used in combination with the main modes. The sub-modes include, for example, an air-conditioning maintaining mode 75 that maintains the air-conditioning performance while the intake-air cooling mode 71 is in effect, and a refrigerant cooling enhancement mode that increases the amount of refrigerant to the intake-air evaporator 51 in accordance with the increase in output of the gasoline engine 1.

A distributor 60 supplies electricity to the spark plugs 21 to ignite them. The engine ECU 57 controls the distributor 60 to supply electricity to the plurality of spark plugs 21 in a prescribed sequence.

A knocking sensor 61, for example, a piezoelectric sensor, that detects vibration of the cylinder 19 is mounted to the outer circumferential portion of the cylinder 19. The knocking sensor 61 is not limited to a piezoelectric sensor, however, and any suitable type may be used.

The knocking sensor 61 may have a sensing portion, for example, inside the cylinder 19, for detecting the cylinder pressure.

A rotational-speed sensor 63 that detects the rotational speed of the crank, in other words, the rotational speed of the gasoline engine 1, is mounted to the crank section.

An airflow sensor 65 is provided to detect the flow volume of air before it enters the supercharger 15 in the intake-air pipe 9.

An intake-air temperature sensor 67 that detects the intake air temperature is mounted at an outlet of the intercooler 49 in the intake air pipe 9.

An air temperature sensor 69 that detects the temperature of vehicle cabin air to be blown out is mounted to a vehicle cabin vent of the evaporator 45.

Detection signals from the knocking sensor 61, the rotation-speed sensor 63, the airflow sensor 65, and the intake-air temperature sensor 67 are input to the engine ECU 57.

A detection signal from the air temperature sensor 69 is input to the air-conditioner ECU 59.

Apart from these, although not illustrated, required information indicating the status of each component is input to the engine ECU 57 and the air-conditioner ECU 59.

Knocking suppression in the gasoline engine 1 equipped with the intake-air cooling device 3 configured as described above will now be explained with reference to FIGS. 2 and 3.

Figure 2:
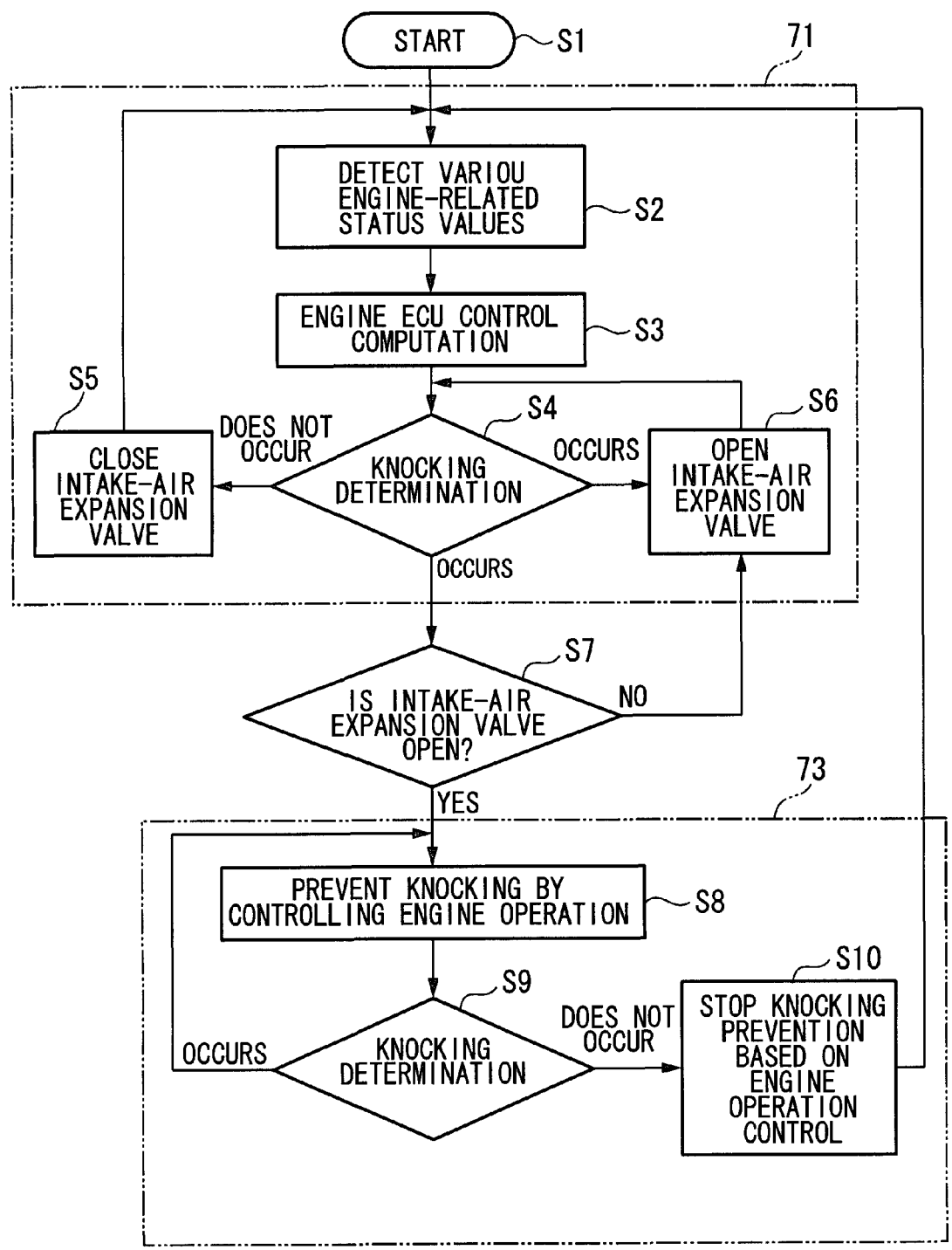
FIG. 2 is a flow chart showing the flow of operation when employing, in combination, an intake-air cooling mode and an engine-operation mode according to an embodiment of the present invention.

FIG. 2 is a flow chart showing the operational flow where the intake-air cooling mode 71 and the engine-operation mode 73 are used in combination. FIG. 3 is a flow chart showing the operational flow in the air-conditioning maintaining mode 75. The flows are as shown in FIGS. 2 and 3, but other flows are also possible.

Knocking suppression will now be described using FIG. 2.

When the gasoline engine 1 starts operating, the engine ECU 57 starts controlling the operation of the gasoline engine 1 (Step S1), whereupon the engine ECU 57 receives detection values from each sensor, including the knocking sensor 61, the rotation-speed sensor 63, the airflow sensor 65, and the intake-air temperature sensor 67, to determine the engine status, such as the cylinder vibration, the engine speed, the flow volume of intake air, the intake-air temperature, and so forth (Step S2).

If the knocking sensor 61 is a sensor that detects the cylinder pressure, cylinder pressure information that is representative of cylinder vibrations is used. Also, the intake-air temperature may be measured where it is introduced into the cylinder 19.

The engine ECU 57 performs control computations on the basis of this information, for example, calculating the correct ignition timing and calculating the correct air-fuel ratio (the fuel injection amount) (Step S3), and controls the operation of the gasoline engine 1 on the basis thereof. This is constantly carried out during operation of the gasoline engine 1.

For example, the engine ECU 57 instructs the calculated correct ignition timing to the distributor 60. The distributor 60 then ignites the spark plugs 21 at a timing according to this instruction.

The engine ECU 57 determines whether knocking occurs on the basis of cylinder vibration information from the knocking sensor 61 (Step S4).

Because the cylinder 19 vibrates in different vibration modes when knocking occurs, the detected cylinder vibration information is compared with a vibration mode occurring during steady operation, which is stored in advance, to determine whether knocking occurs.

Even if no knocking at all occurs at this time, because the vibration mode changes when knocking is about to occur, it is possible to predict knocking.

If it is determined in Step S4 that knocking does not occur, the engine ECU 57 instructs the air-conditioner ECU 59 to close the intake-air expansion valve 55 (Step S5). The air-conditioner ECU 59 checks the open/closed state of the intake-air expansion valve 55 and closes it if it is open. On the other hand, if the intake-air expansion valve 55 is closed, no action is taken.

If it is determined in Step S4 that knocking occurs, the engine ECU 57 instructs the air-conditioner ECU 59 to open the intake-air expansion valve 55 (Step S6). In response to this instruction, the air-conditioner ECU 59 opens the intake-air expansion valve 55. When the intake-air expansion valve 55 is opened, liquid refrigerant is supplied to the intake-air evaporator 51 via the bypass refrigeration circuit 53.

This refrigerant evaporates while exchanging heat with the intake air passing through the intake-air pipe 9 and cools the intake air via the latent heat of evaporation.

When the intake air is cooled, the temperature of the intake air taken into the cylinder 19 (gasoline engine 1) falls, and therefore, it is possible to improve the charging efficiency and to reduce the incidence of knocking.

Accordingly, it is possible to reduce the incidence of knocking in the gasoline engine 1 without, for example, delaying the ignition timing of the spark plugs 21 and without enriching the air-fuel ratio. Therefore, it is possible to increase the output of the gasoline engine 1 and to reduce the fuel consumption, in other words, to achieve high-efficiency operation.

Because the intake-air expansion valve 55 is opened when the state where knocking is about to occur is detected by the knocking sensor, intake-air cooling is performed just as cooling is required.

Accordingly, the intake-air evaporator 51 is not supplied with refrigerant during unnecessary periods, in other words, during periods where knocking is not about to occur. Thus, because refrigerant does not flow in the intake-air evaporator 51 during periods where a countermeasure, in other words, cooling with the intake-air evaporator 51, is not necessarily required, for example, additional output from gasoline engine 1 for maintaining the air-conditioning performance is not necessary.

As a result, the operating efficiency of the gasoline engine 1 is not needlessly reduced, and therefore, the gasoline engine 1 can operate with high efficiency.

At this time, as shown in FIG. 2, the engine ECU can use both the intake-air cooling mode 71 and the engine-operation mode 73 in combination.

If it is determined in Step S4 that knocking occurs, the engine ECU 57 obtains information about the open/closed state of the intake-air expansion valve 55 from the air-conditioner ECU 59 and determines whether the intake-air expansion valve 55 is open (Step S7).

If the intake-air expansion valve 55 is closed, the flow proceeds to step S6, where processing identical to that described above is performed to open the intake-air expansion valve 55.

On the other hand, if the intake-air expansion valve 55 is open, the gasoline engine 1 enters the engine-operation mode 73.

This is because, ordinarily for the engine ECU 57 to prevent knocking, the intake-air cooling mode 71 is given priority.

Combined use of the engine-operation mode 73 in this way is for cases where, for example, the output of the gasoline engine 1 increases suddenly, and it is determined that knocking suppression would be insufficient in the normal intake-air cooling mode 71.

In the engine-operation mode 73, the engine ECU 57 reduces the incidence of knocking by controlling the engine operation, for example, by delaying (lagging) the ignition timing and/or by increasing the air-fuel ratio (increasing the fuel injection amount) (Step S8).

Next, it is determined whether knocking occurs (Step S9), in the same way as in Step S4.

If it is determined that knocking does not occur in Step S9, the engine ECU 57 stops preventing knocking based on engine operation control, and reverts to the original engine operating state (Step S10).

If it is determined that knocking occurs in Step S9, the engine ECU 57 continues to prevent knocking based on engine operation control.

When the refrigerant flows in the intake-air evaporator 51 in the intake-air cooling mode 71, the refrigerant flowing through the evaporator 45 is reduced by a corresponding amount, and the cooling performance of the vehicle cabin drops.

When refrigerant is flowing in the intake-air evaporator 51, the engine ECU 57 can instruct the air-conditioning ECU 59 to use the air-conditioning maintaining mode 75, in which a drop in cooling performance of the vehicle cabin should be prevented. Alternatively, the air-conditioner ECU 59 may independently enter the air-conditioning maintaining mode 75.

The air-conditioning maintaining mode 75 will be described with reference to FIG. 3.

Once the air-conditioner ECU 59 starts the air-conditioning maintaining mode 75 (Step S21), the air-conditioner ECU 59 gathers statuses from various sensors, such as the air-temperature sensor 69, including the outside air temperature, the amount of solar radiation, the temperature of air blown out from the evaporator 45 (the air temperature after the evaporator), and so forth (Step S22).

The air-conditioner ECU 59 calculates the air temperature after the evaporator as a target value (target temperature) on the basis of these detected values (Step S23).

Then, the air temperature after the evaporator detected by the air temperature sensor 69 (detected temperature) is compared with the target temperature (step S24).

If the target temperature is lower than the detected temperature, no action is taken.

If the target temperature is higher than the detected temperature, the refrigerant supply performance of the compressor 37 is increased (step S25).

Increasing the refrigerant supply performance of the compressor 37 is achieved by, for example, increasing the engagement time of the electromagnetic clutch 38 to increase the duty ratio of the compressor, or increasing the capacity with a variable-capacity compressor.

Thus, in the air-conditioning maintaining mode 75, because the refrigerant supply performance is adjusted so that the air temperature after the evaporator does not reach or exceed the target temperature, it is possible to prevent a drop in the cooling performance inside the vehicle cabin.

The engine ECU 57 is also provided with a refrigerant cooling enhancement mode. The refrigerant cooling enhancement mode is a mode in which, in the case of the intake-air cooling mode 71, the supply of refrigerant to the air-conditioning refrigeration circuit 47 is stopped, and all of the refrigerant is supplied to the intake-air evaporator 51.

By doing so, because the level of cooling in the intake-air evaporator 51 is especially high, it is possible, for example, to perform effective cooling in response to an increase in amount of intake air according to a sudden increase in the output of the gasoline engine 1.

In such a case, rather than all of the refrigerant, it may be increased higher than usual.

The present invention is not limited to the embodiments described above; suitable modifications are possible without departing from the spirit of the invention.

For example, in this embodiment, although the intake-air expansion valve 55 has dual functions, that is, an opening-and-closing valve and an expansion valve, an opening-and-closing valve and an expansion valve may be provided separately.

In this embodiment, the intake-air evaporator 51 is either supplied with refrigerant or is not supplied with refrigerant; however, the intake-air evaporator 51 may be constantly supplied with a small amount of refrigerant during operation of the gasoline engine 1.

For example, a pipe that is always open, for supplying refrigerant to the intake-air evaporator 51, may be provided separately from the bypass refrigeration circuit 53, or the intake-air expansion valve 51 may always be kept open a small mount.

In this way, because the intake-air evaporator 51 constantly receives a small amount of refrigerant during operation, the intake-air evaporator 51 is always cooled during operation; in other words, it is pre-cooled.

By doing so, because the intake-air evaporator 51 is kept at a comparatively low temperature, when the intake-air expansion valve 55 is opened and refrigerant is supplied to the intake-air evaporator 51, this refrigerant can immediately cool the intake air without being used to cool the intake-air evaporator 51 itself.

Therefore, when knocking is detected and the intake-air expansion valve 55 is opened, it is possible to cool the intake air without delay.

The small amount of constantly supplied refrigerant means an amount that avoids energy loss as much as possible. This amount is roughly an amount that allows the intake-air evaporator 51 to be maintained at a prescribed temperature.

In this embodiment, the intake-air cooling mode 71 is given priority; however, any problems associated therewith may be eliminated by operating with priority given to the engine-operation mode 73, in combination with the refrigerant cooling enhancement mode.

Specifically, when the engine-operation mode 73 is in effect, because the spark-plug ignition timing is delayed and/or the air-fuel ratio is enriched, the operating efficiency of the gasoline engine 1 is reduced; however, by operating in the intake-air cooling mode 71, it is possible, to a certain extent, to avoid a drop in operating efficiency by cooling the intake air.

What is claimed is:

1. An intake-air cooling device for an internal combustion engine equipped with an intercooler that cools intake air with outside air and an intake-air evaporator that cools the intake air with refrigerant circulating in an air-conditioning refrigeration circuit, provided in this sequence in an intake-air channel from a supercharger to the internal combustion engine, the intake-air cooling device comprising:
   a knocking sensor that detects knocking of the internal combustion engine; and
   an opening-and-closing valve that opens and closes a supply channel of the refrigerant to the intake-air evaporator,
   wherein the opening-and-closing valve is configured so as to open when the knocking sensor detects knocking.

2. An intake-air cooling device for an internal combustion engine according to claim 1, wherein the knocking sensor detects vibration of the internal combustion engine.

3. An intake-air cooling device for an internal combustion engine according to claim 1, wherein the knocking sensor detects a cylinder pressure of the internal combustion engine.

4. An intake-air cooling device for an internal combustion engine according to claim 1, wherein when the opening-and-closing valve is opened, the refrigeration circuit adjusts the performance of a compressor that compresses and supplies the refrigerant so as to maintain air-conditioning performance at a prescribed level.

5. An intake-air cooling device for an internal combustion engine according to claim 1, wherein the intake-air evaporator is configured so as to constantly receive a prescribed amount of refrigerant during operation.

6. An intake-air cooling device for an internal combustion engine according to claim 1, wherein when the output of the internal combustion engine is large, all of the refrigerant flowing in the refrigeration circuit is made to flow to the intake-air evaporator.

7. An automobile comprising an intake-air cooling device for an internal combustion engine according to claim 1.

* * * * *